(12) United States Patent
Sumizawa et al.

(10) Patent No.: US 7,668,650 B2
(45) Date of Patent: Feb. 23, 2010

(54) ON-VEHICLE INFORMATION TERMINAL, ABRIDGED MAP GENERATING APPARATUS, ABRIDGED MAP DISPLAY METHOD AND DISPLAY APPARATUS

(75) Inventors: Akio Sumizawa, Zama (JP); Wataru Oikubo, Zama (JP); Manabu Morita, Zama (JP); Atsushi Hiroike, Kokubunji (JP); Masaaki Tanizaki, Kokubunji (JP); Kishiko Maruyama, Kokubunji (JP); Shigeru Shimada, Kokubunji (JP)

(73) Assignee: Xanavi Informatics Corporation, Zama-shi (JP)

( * ) Notice: Subject to any disclaimer, the term of this patent is extended or adjusted under 35 U.S.C. 154(b) by 484 days.

(21) Appl. No.: 11/087,970

(22) Filed: Mar. 24, 2005

(65) Prior Publication Data
US 2005/0216188 A1    Sep. 29, 2005

(30) Foreign Application Priority Data
Mar. 24, 2004    (JP) .............................. 2004-087365

(51) Int. Cl.
*G01C 21/32*    (2006.01)
(52) U.S. Cl. .................... 701/208; 345/694; 340/995.1; 340/905
(58) Field of Classification Search ................. 701/208, 701/211; 340/995.1, 995.21, 995, 438; 342/191; 345/694; *G01C 21/32*
See application file for complete search history.

(56) References Cited

U.S. PATENT DOCUMENTS

| | | | | |
|---|---|---|---|---|
| 5,146,219 A * | 9/1992 | Zechnall | ................ | 340/995.24 |
| 5,170,165 A * | 12/1992 | Iihoshi et al. | ........... | 340/995.22 |
| 5,315,295 A * | 5/1994 | Fujii | ........................ | 340/936 |
| 5,485,381 A * | 1/1996 | Heintz et al. | ................... | 701/93 |
| 5,539,397 A * | 7/1996 | Asanuma et al. | ............ | 340/901 |
| 5,661,650 A * | 8/1997 | Sekine et al. | ................. | 701/82 |
| 6,230,083 B1* | 5/2001 | Matsuda et al. | ................ | 701/1 |
| 6,304,818 B1* | 10/2001 | Kamiya | ...................... | 701/200 |
| 6,385,528 B1* | 5/2002 | Takahashi | ..................... | 701/93 |
| 6,487,305 B2* | 11/2002 | Kambe et al. | ............... | 382/113 |
| 6,920,392 B2* | 7/2005 | Adachi | ....................... | 701/208 |
| 2001/0012981 A1* | 8/2001 | Yamashita et al. | .......... | 701/211 |
| 2001/0041953 A1* | 11/2001 | Jitsukata et al. | ............... | 701/28 |
| 2003/0149525 A1 | 8/2003 | Matsuda et al. | | |

(Continued)

FOREIGN PATENT DOCUMENTS

JP    5-240653 A    9/1993

(Continued)

*Primary Examiner*—Tuan C To
(74) *Attorney, Agent, or Firm*—Crowell & Moring LLP

(57) ABSTRACT

The on-vehicle information terminal according to the present invention comprises an abridged road generating device that generates abridged roads by abridging a road map based upon map data, a road decision-making device that makes a decision as to whether or not a road is a special shape road having a predetermined special shape based upon the map data, a substituting device for substitutes a specific road shape pattern stored in memory in advance for a road determined by the road decision-making device to have a special shape and a display control device that displays at the display device an abridged map containing specific road shape patterns used to substitute for special shape roads by the substituting device and the abridged roads generated by the abridged road generating device.

21 Claims, 12 Drawing Sheets

U.S. PATENT DOCUMENTS

2004/0236507 A1 * 11/2004 Maruyama et al. .......... 701/208

FOREIGN PATENT DOCUMENTS

| JP | 10-177338 A | 6/1998 |
| JP | 11-194706 A | 7/1999 |
| JP | 11-202762 | 7/1999 |
| JP | 2002-257578 A | 9/2002 |

* cited by examiner

ON-VEHICLE INFORMATION TERMINAL, ABRIDGED MAP GENERATING APPARATUS, ABRIDGED MAP DISPLAY METHOD AND DISPLAY APPARATUS

INCORPORATION BY REFERENCE

The disclosure of the following priority application is herein incorporated by reference:
Japanese Patent Application No. 2004-87365 filed Mar. 24, 2004

BACKGROUND OF THE INVENTION

1. Field of the Invention

The present invention relates to a method and an apparatus that may be adopted to display a map simplified based upon map data.

2. Description of Related Art

There is a method known in the related art, as described in Japanese Patent Publication No. 11-202762, through which a simplified and thus easier-to-read- version of an original map is displayed by executing processing such as linearization or orthogonalization on the shapes of roads indicated in the map data and displaying only landmark information within a specific range. However, when the shapes of roads are simplified through linearization or orthogonalization processing, a road having a special shape may be rendered in a shape more confusing than the original shape.

SUMMARY OF THE INVENTION

The on-vehicle information terminal according to the present invention includes an abridged road generating device that generates an abridged road by abridging a road map based upon a map data, a road decision-making device that makes a decision as to whether or not a road is a special shape road having a predetermined special shape based upon the map data, a substituting device that substitutes a specific road shape pattern stored in memory in advance for the road judged to be the special shape road by the road decision-making device and a display control device that displays at a display device an abridged map containing the specific road shape pattern substituted for the special shape road by the substituting device and the abridged road generated by the abridged road generating device.

It is desirable that the abridged road generating device included in the on-vehicle information terminal generates the abridged roads through streamline processing for simplifying road shapes by linearizing and orthogonalizing the road shapes based upon the map data.

It is also desirable that the road in the map data used in the on-vehicle information terminal is constituted with a plurality of links for each of which a link type indicating a road type is set and that the road decision-making device makes a decision as to whether or not a given road is the special shape road based upon the link type.

It is to be noted that if the special shape road contains a circular intersection, the road decision-making device at the on-vehicle information terminal may make a decision as to whether or not a road constitutes the circular intersection based upon the link type and the substituting device at the on-vehicle information terminal may substitute a circular or elliptical road shape pattern stored in memory in advance for the road judged to be the circular intersection by the road decision-making device.

In addition, if the special shape road includes a side road, the road decision-making device at the on-vehicle information terminal may make a decision as to whether or not a road is the side road based upon the link type and the substituting device at the on-vehicle information terminal may substitute a trapezoidal road shape pattern, a triangular road shape pattern or a circular arc road shape pattern stored in memory in advance for the road judged to be the side road by the road decision-making device.

Furthermore, if the special shape road includes a bidirectional lane, the road decision-making device at the on-vehicle information terminal may make a decision as to whether or not a road is the bidirectional lane based upon the link type and the substituting device at the on-vehicle information terminal may substitute a single linear road shape pattern stored in memory in advance for the road judged to be the bidirectional lane by the road decision-making device to represent the traffic moving in both directions together.

The abridged map generating apparatus according to the present invention includes an abridged road generating device that generates an abridged road by abridging a road map based upon a map data, a road decision-making device that makes a decision as to whether or not a road is a special shape road having a predetermined special shape based upon the map data, a substituting device that substitutes a specific road shape pattern stored in memory in advance for the road judged to be the special shape road by the road decision-making device and an abridged map output device that outputs to an external recipient a signal constituting an abridged map containing the specific road shape pattern substituted for the special shape road by the substituting device and the abridged road generated by the abridged road generating device.

The abridged map display method according to the present invention includes steps for generating an abridged road by abridging a road map based upon map data, making a decision as to whether or not a road is a special shape road having a predetermined special shape based upon the map data, substituting a specific road shape pattern stored in memory in advance for the road judged to be the special shape road and displaying an abridged map containing the specific road shape pattern substituted for the special shape road and the abridged road.

The display apparatus according to the present invention displays an abridged map which is formed by connecting an abridged road generated by simplifying a road shape and a predetermined circular line for indicating a circular intersection.

DESCRIPTION OF THE PREFERRED EMBODIMENTS

Figure 1:
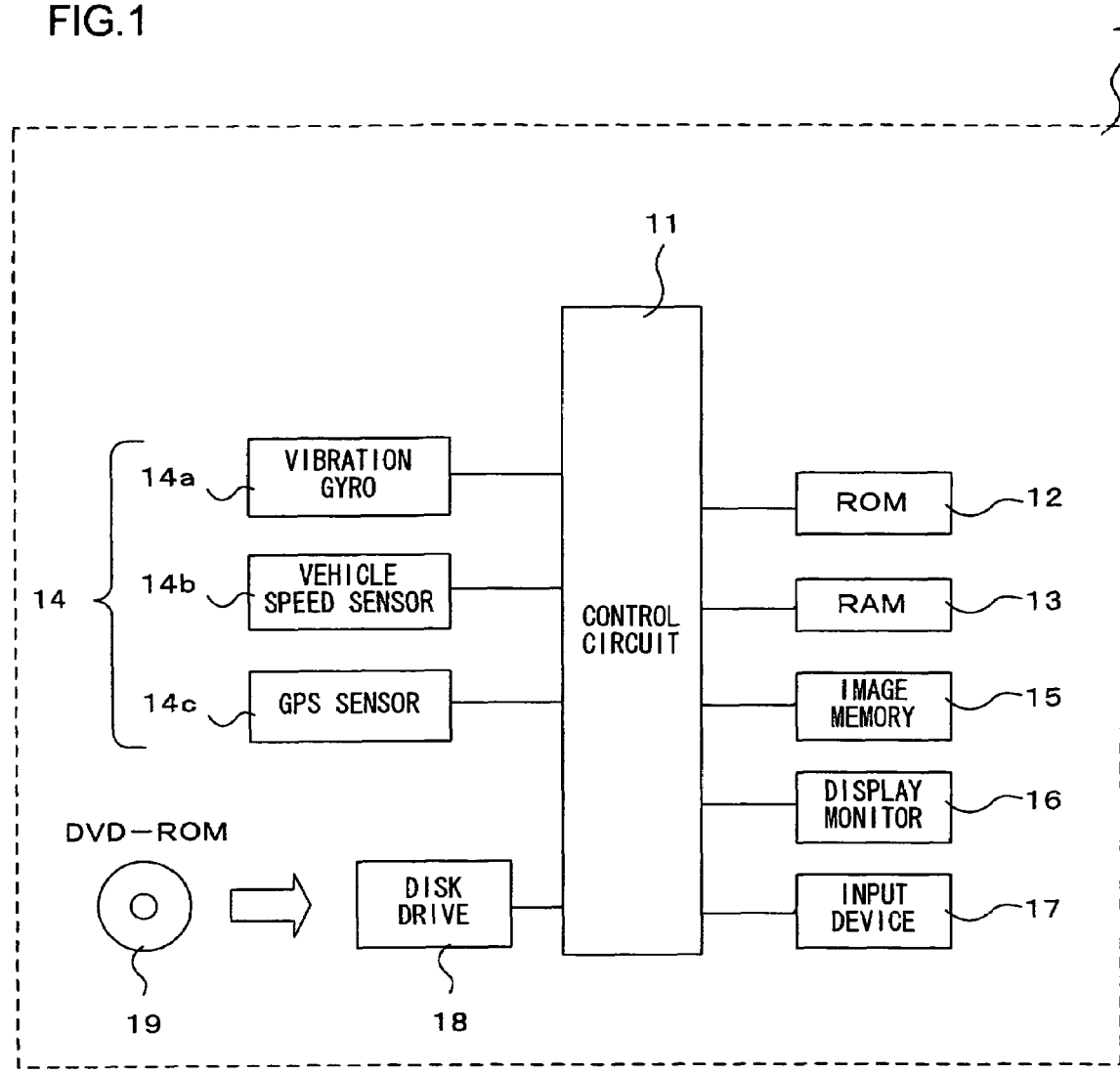
FIG. 1 is a block diagram showing the structure of the navigation system achieved in an embodiment of the present invention.

FIG. 1 shows the structure adopted in the navigation system achieved in an embodiment of the present invention. The navigation system, which is installed in a vehicle, generates and displays an abridged version (here after referred to as an abridged map) of a regular map by simplifying road shapes and the like based upon the regular map. The navigation system 1 in FIG. 1 includes a control circuit 11, a ROM 12, a RAM 13, a current position detection device 14, an image memory 15, a display monitor 16, an input device 17 and a disk drive 18. A DVD-ROM 19 having recorded therein map data is loaded into the disk drive 18.

The control circuit 11 constituted with a microprocessor and its peripheral circuits uses the RAM 13 as its work area when executing a control program stored in the ROM 12 to implement various types of processing and control. As the control circuit 11 executes abridged map generation processing to be detailed later, an abridged map is generated based upon the map data recorded in the DVD-ROM 19 and the abridged map thus generated is displayed at the display monitor 16. Road shape patterns each corresponding to a specific link type, which are to be explained later, are also stored in the ROM 12.

The current position detection device 14, which detects the current position of the subject vehicle, may comprise, for instance, a vibration gyro 14a that detects the advancing direction of the subject vehicle, a vehicle speed sensor 14b that detects the vehicle speed, a GPS sensor 14c that detects a GPS signal transmitted from a GPS satellite and the like. Based upon the current position of the subject vehicle detected by the current position detection device 14, the navigation system 1 determines the range over which the abridged map is to be generated, a route search start point and the like, and displays the current position of the subject vehicle on the abridged map.

In the image memory 15, image data to be displayed at the display monitor 16 are stored. The image data include road map drawing data and various types of graphic data used to display the abridged map, which are generated through the abridged map generation processing executed by the control circuit 11. Under the control implemented by the control circuit 11, the abridged map is brought up on display for the user at the screen of the display monitor 16 by using the image data stored in the image memory 15. The input device 17 includes various types of input switches through which the user sets a destination, a waypoint (hereafter simply and collectively referred to as a destination) and may be an operation panel or a remote-control device. By operating the input device 17 as prompted by screen instructions displayed at the display monitor 16, the user is able to set a destination by specifying its geographical name or its position on the map.

The diskdrive 18 reads out map data to be used to generate the abridged map from the DVD-ROM 19 loaded therein. The map data include route calculation data used to calculate a recommended route to the destination, route guidance data indicating intersection names, road names and the like and used to guide the subject vehicle to the destination along the recommended route, road data expressing roads and background data indicating physical features other than roads, such as rivers, railways and various types of facilities (landmarks) present on the map.

The smallest unit representing a road section in the road data is referred to as a link and each road is constituted with a plurality of links. A point at which links connect with each other is referred to as a node, and position information (coordinate information) is provided in correspondence to each node. Based upon the position information corresponding to the individual nodes, the link shapes, i.e., specific road shapes, are determined. By executing streamline processing to be detailed later on such road data, an abridged map is generated. Information (link type information) related to a road type is set in correspondence to each link. It is to be noted that while the map data are read out from the DVD-ROM in this example, the map data may instead be read out from a recording medium other than a DVD-ROM, e.g., a CD-ROM or a hard disk.

Once the user sets the destination, the navigation system 1 determines through an arithmetic operation the route to the destination by setting the current position detected by the current position detection device 14 as a route search start point and using a specific algorithm based upon the route calculation data mentioned earlier. The recommended route thus determined is displayed on the abridged map by altering its display mode, e.g., by using a different display color, so as to ensure that it can easily be distinguished from the other roads. As a result, the user is able to check the recommended route on the abridged map at the screen. In addition, the navigation system 1 guides the subject vehicle along the recommended route by providing visual or audio instructions for the user along the advancing direction. The subject vehicle is thus guided to the destination.

Figure 2:
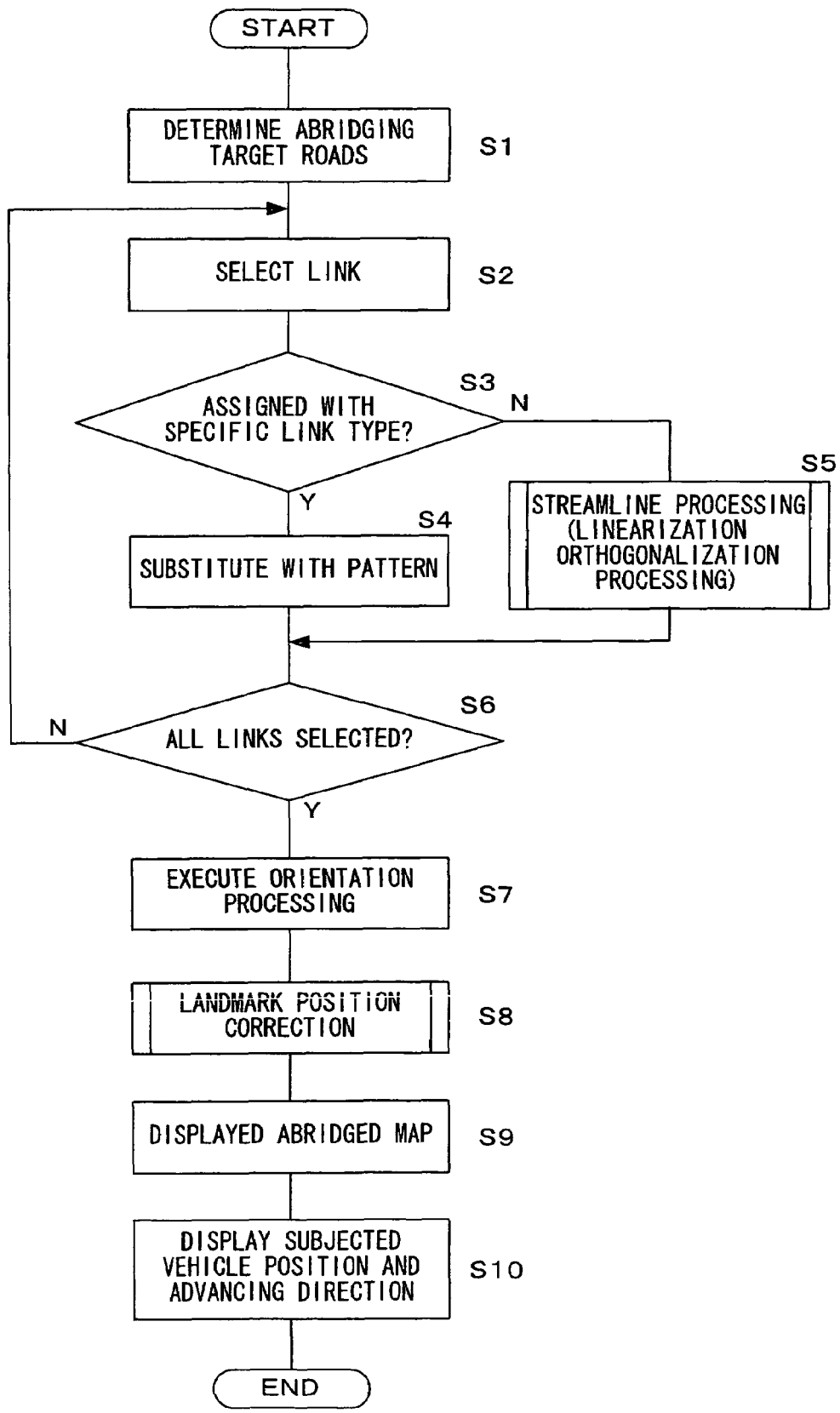
FIG. 2 presents a flowchart of the abridged map generation processing.

FIG. 2 presents a flowchart of the abridged map generation processing executed in the control circuit 11. In step S1, roads to undergo the abridged map generation (hereafter referred to as abridging-target roads) are determined within a specific map range in the road data. In this example, the roads included in the recommended route having been set as described earlier and roads intersecting the recommended route are designated as abridging-target roads. It is to be noted that while all the roads intersecting the recommended route may be designated as abridging-target roads, only selected roads of specific road types or the like may be designated as abridging-target roads to generate an even easier-to-read abridged map if, for instance, a great number of roads intersect the recommended route.

In step S2, one of the links constituting an abridging-target road designated in step S1 is selected. It is to be noted that a link present at an end is sequentially selected each time step S2 is executed. For instance, the links may be selected sequentially, starting with the link on which the subject vehicle is currently located toward the next guidance-requiring intersection.

In step S3, a decision is made as to whether or not the link selected in step S2 is assigned with a specific link type. Specific link types as referred to in this context are to be explained later. If a specific link type is set for the link, the operation proceeds to step S4 to replace the link with a road shape pattern corresponding to the link type, as explained later. It is to be noted that the road shape pattern is stored in the ROM 12 as mentioned earlier. If, on the other hand, it is decided in step S3 that the link is not assigned with a specific link type, the operation proceeds from step S3 to step S5 to execute streamline processing (linearization, orthogonalization) on the link. The streamline processing, too, is to be explained in detail later, separately from the road shape pattern replacement. Once step S4 or step S5 is executed, the operation proceeds to step S6.

In step S6, a decision is made as to whether or not all the links contained in the abridging-target roads have been selected in step S2 having been executed up to that point. The operation proceeds to step S7 if all the links have been selected. However, the operation returns to step S2 if there is a link that has not been selected and in this case, after the link is selected in step S2, the processing in steps S3 through S5 is executed on the particular link. By executing the processing in steps S3 through S5 on all the links contained in the abridging-target roads as described above, an abridged map is generated.

In step S7, orientation processing is executed on the generated abridged map. The orientation processing in this context refers to processing through which the route, viewed from the current position, is set along the direction directly upward on the screen by rotating the entire abridged map around the center thereof. It is to be noted that this orientation processing may be executed as necessary and may be omitted. In addition, the orientation of the route viewed from the current position does not need to be set along the direction extending directly upward on the screen. For instance, the direction along which the vehicle enters the next guidance-requiring intersection may be oriented upward on the screen instead.

In step S8, the positions of landmarks in the abridged map are corrected. The landmark position correction is to be explained in detail later. In step S9, the landmarks, the position of which have been corrected in step S8, are superimposed on the abridged map, and the resulting abridged map is displayed at the display monitor 16. In step S10, the subject vehicle position and the advancing direction of the subject vehicle are indicated in the abridged map brought up on display in step S9. Once the processing in step S10 is executed, the processing flow in FIG. 2 ends. The abridged map is generated and displayed as explained above.

The specific link types with regard to which the decision is made in step S3, as described above, are now explained. In the following explanation, a road having a specific shape which will be rendered through the streamline processing in step S5 in a shape more confusing than the original shape is referred to as a special shape road. More specifically, special shape road types include (1) a circular road, (2) a road branching out from another road and extending parallel to the other road, (3) a road having separate lanes for traffic moving in opposite directions and the like. Examples of circular roads in (1) include circular intersections (roundabouts) and examples of branching roads in (2) include side roads (ramps) at overpass intersections. In addition, roads in type (3) are referred to as bidirectional lanes.

For links in special shape roads such as circular intersections, side roads and bidirectional lanes explained above, matching specific link types are set. Thus, a given link (road) can be determined to be either a special shape road or a non-special shape road by referencing the associated link type, and if the link is determined to be a special shape road, a decision can be made by referencing the link type as to the exact road type, i.e., a circular intersection, a side road or a bidirectional lane. Through the decision-making executed in step S3, it is determined whether or not a specific link type indicating a special shape road is set for the link.

Next, an explanation is given on a specific road shape pattern used in step S4 to replace a link determined to have a specific link type set in association therewith, as described above. In step S4, a link determined in step S3 to have a specific link type set in association therewith, i.e., a link constituting a special shape road, is replaced with the road shape pattern matching the link type. In more specific terms, a link constituting a circular intersection is replaced with a circular road shape pattern and a link constituting a side road is replaced with a trapezoidal road shape pattern. A link constituting a bidirectional lane is replaced with a single-line linear road shape pattern representing the lanes for the traffic moving in both directions.

It is to be noted that any road shape patterns other than those described above may be used for substitution as long as they assume simple, easy-to-read shapes. For instance, a circular intersection may be replaced with an elliptical road shape pattern instead of a circular road shape pattern, and a side road may be replaced with a triangular or circular arc road shape pattern instead of a trapezoidal road shape pattern.

Figure 3A:
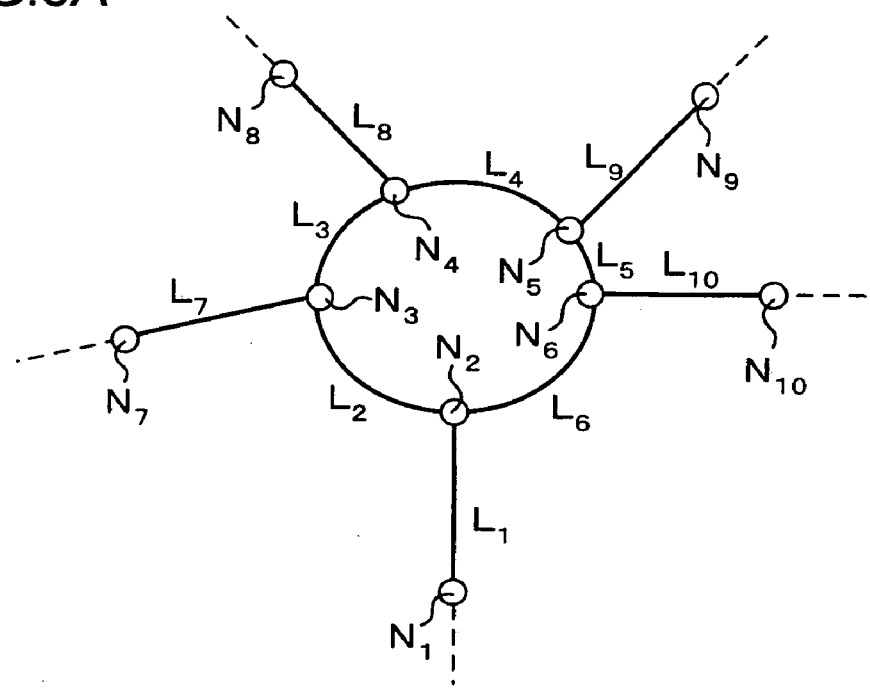
FIGS. 3A and 3B show an example in which links constituting a circular intersection are replaced with a circular road pattern.
Figure 3B:
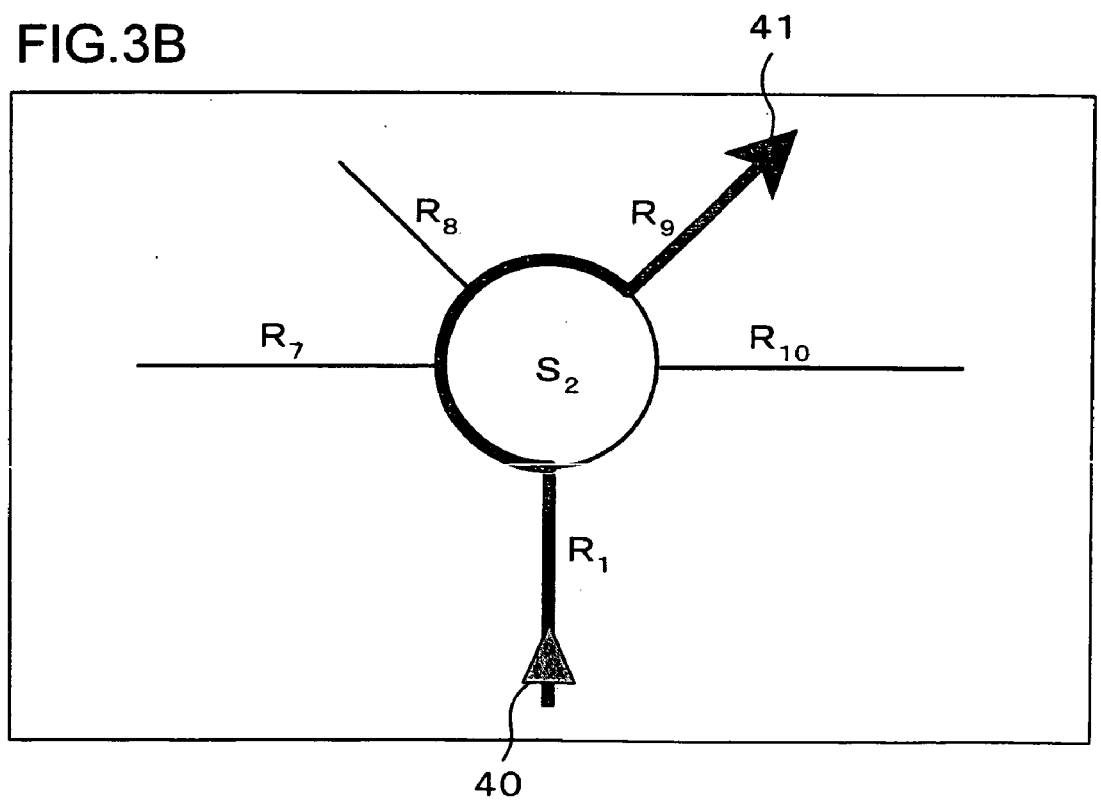

FIGS. 3A, 3B, 4A, 4B, 5A and 5B present examples of how links constituting special shape roads are replaced with the corresponding road shape patterns in step S4. FIGS. 3A and 3B show an example in which links constituting a circular intersection are replaced with a circular road pattern. FIG. 3A shows nodes N1 to N10 and links L1 to L10 connecting the individual nodes in the original map data. The links L2 to L6 among the links L1 to L10 constitute a circular intersection, and the specific link type, i.e., the circular intersection, is indicated for these links. It is to be noted that the dotted lines in FIGS. 3A, 4A and 5A each indicate that the subsequent links connected ahead are not included in the illustration.

FIG. 3B shows the screen display of the abridged map generated based upon the links shown in FIG. 3A. When generating this abridged map, an abridged road R1 is first obtained by executing the streamline processing to be detailed later in step S5 on the link L1 in FIG. 3A. Next, in step S4, the links L2 to L6 constituting the circular intersection are replaced with a circular road shape pattern S2, which is then connected with the abridged road R1. Once the circular intersection is replaced with the road shape pattern S2, abridged roads R7 to R10 to connect with the road shape pattern S2 are obtained through streamline processing executed on the links L7 to L10 respectively. The abridged map is thus generated.

It is to be noted that the abridged roads R1 and R7 to R10 are connected with the road shape pattern S2 in increments matching the unit angle Δθ (e.g., 45°) set for the streamline processing to be detailed later relative to the center of the road shape pattern S2. The positions at which the individual abridged roads connect with the road shape pattern are determined in correspondence to the positions of the nodes N2 to N6 at which the unabridged links L1 and L7 to L10 individually connect with the circular intersection. More specifically, the road shape pattern S2 and the abridged road R1 are connected and the abridged road R7 is connected at the position (the 180° position in the vector diagram created in reference to the horizontal rightward direction) reached by rotating by 90° the position at which the abridged road R1 is connected (the 270° position in the vector diagram created relative to the horizontal rightward direction) along the road shape pattern S2 to the left.

Then, the abridged road R8 is connected at the position (the 135° position in the vector diagram) reached by rotating from the 180° position by 45°, the abridged road R9 is connected at the position (the 45° position) reached by a rotating from the 135° position by 90° and the abridged road R10 is connected at the position (the 0° position) reached by rotating from the 45° position by 45°, to the road shape pattern S2. As explained above, the abridged roads R1 and R7 to R10 are individually connected with the road shape pattern S2 by ensuring that their positional relationships to the road shape pattern S2 are indicated in increments matching the unit angle Δθ set for the streamline processing. Thus, the abridged map is formed by connecting the abridged roads generated by simplifying road shapes and the predetermined circular line for indicating a circular intersection.

The recommended route (the roads indicated with the bold line in the figure), a subject vehicle position mark 40 and an advancing direction mark 41 are displayed on the abridged map created as described above, and thus, the abridged map shown in FIG. 3B is displayed on the screen.

Figure 4A:
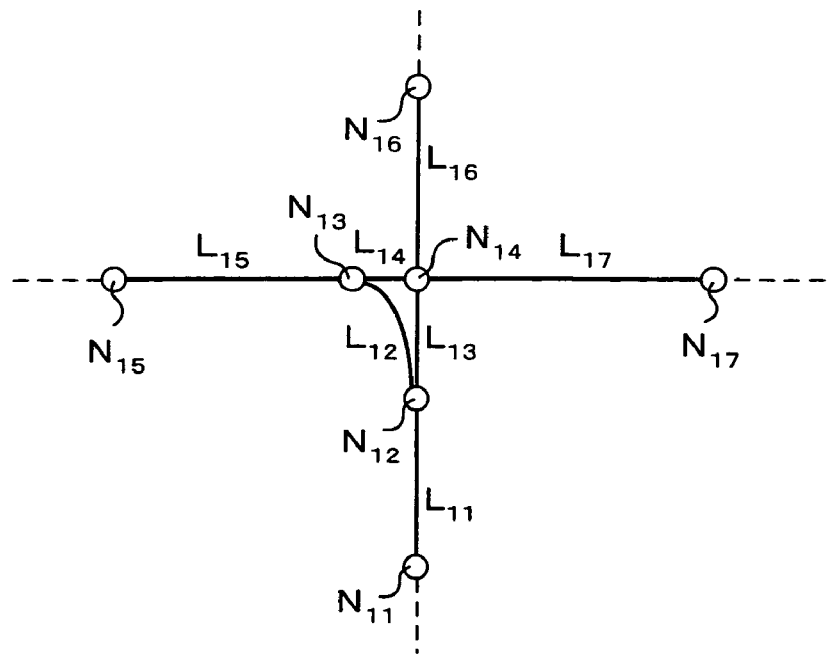
FIGS. 4A and 4B show an example in which a link constituting a side road is replaced with a trapezoidal road pattern.
Figure 4B:
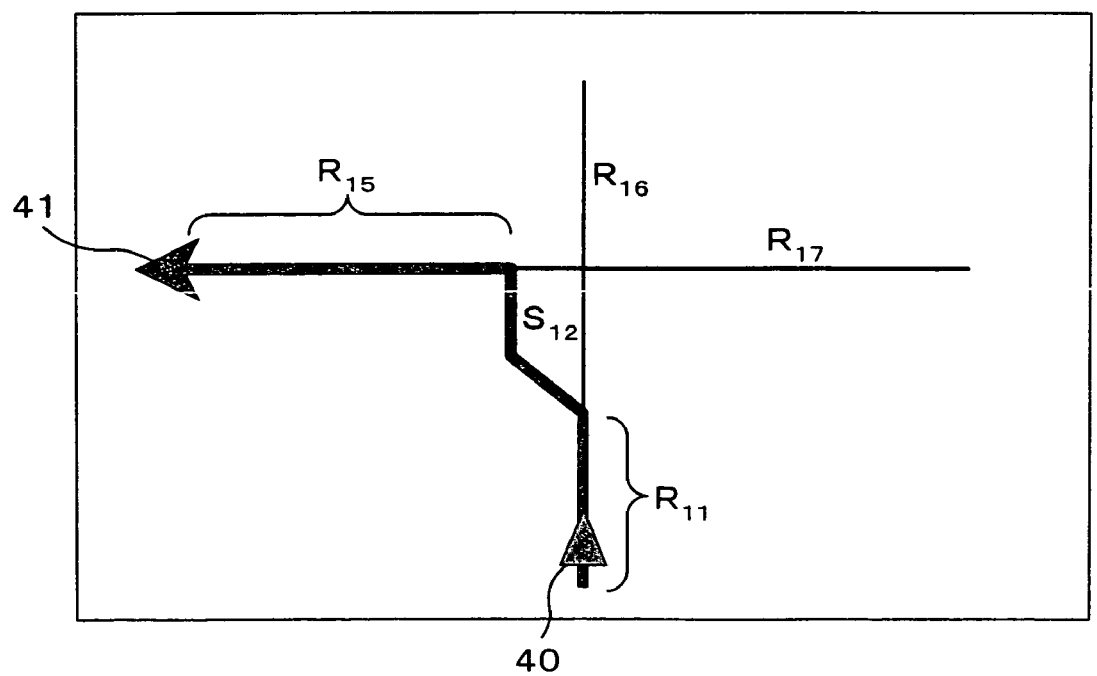

FIGS. 4A and 4B show an example in which a link constituting a side road is replaced with a trapezoidal road shape pattern. FIG. 4A shows nodes N11 to N17 and links L11 to L17 of which the link L12 constitutes a side road. In this situation, an abridged road R11 is first obtained in correspondence to the link L11, and then, the link L12 constituting the side road and links (the links L13 and L14) corresponding to the roads running next to the side road and forming an intersection are replaced with a trapezoidal road shape pattern S12. Once these links are replaced with the road shape pattern S12, abridged roads R15 to R17 obtained through streamline processing executed on the remaining links L15 to L17 are connected with the road shape pattern S12 on display. The recommended route, the subject vehicle position mark 40 and the advancing direction mark 41 are displayed on the abridged map created as described above, and thus, the abridged map shown in FIG. 4B is displayed on the screen.

Figure 5A:
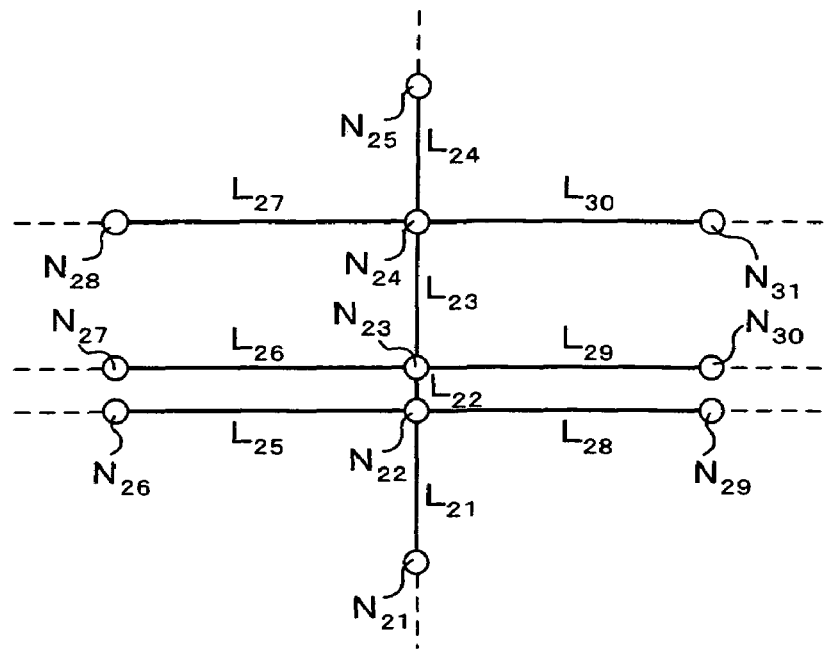
FIGS. 5A and 5B show an example in which links constituting a bidirectional lane are replaced with a single-line road pattern.
Figure 5B:
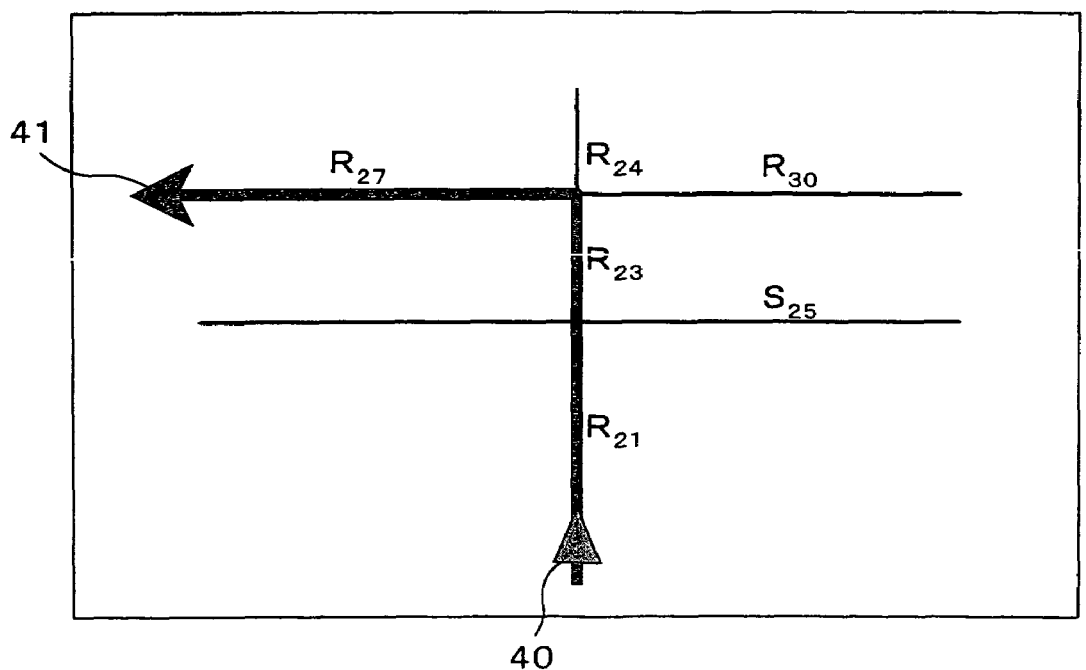

FIGS. 5A and 5B show an example in which links constituting the upward traffic line and the downward traffic lane in a bidirectional lane are together replaced with a single-line linear road shape pattern. FIG. 5A shows nodes N21 to N31 and links L21 to L30. A bidirectional lane is constituted with the road that include the links L25 and L26 and the road that includes the links L28 and L29. Namely, the specific link type, i.e., the bidirectional lane, is set for the links L25, L26, L28 and L29. In this case, the links L25, L26, L28 to L29 constituting the bidirectional lane are replaced with a single-line linear road shape pattern S25, and abridged roads R21, R23, R24, R27 and R30 are obtained by executing streamline processing on the remaining links. By connecting the abridged roads to the road shape pattern S25, the abridged map is generated and the abridged map is displayed on the screen as shown in FIG. 5B with the recommended route, the subject vehicle position mark 40 and the advancing direction mark 41 displayed on the abridged map.

As described above, the abridged map is created by replacing links having specific link types set therefore with the road shape patterns matching the individual link types in step S4 and executing the streamline processing on the other links in step S5. The streamline processing is now explained in detail.

FIGS. 6A to 6E and 7A to 7H illustrate in detail the streamline processing executed to generate the abridged map according to the present invention. In reference to FIGS. 6A to 6E, streamline processing (1) through which the shape of a road is linearized (the data of the make-up points constituting the road are culled) is explained.

Figure 6A:
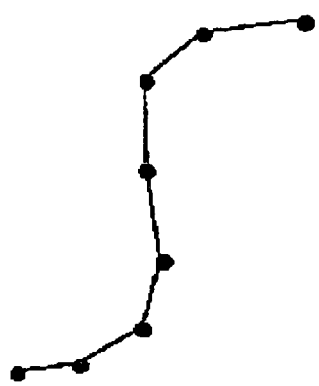
FIGS. 6A to 6E illustrate the streamline processing (1) executed to generate an abridged map.
Figure 6B:
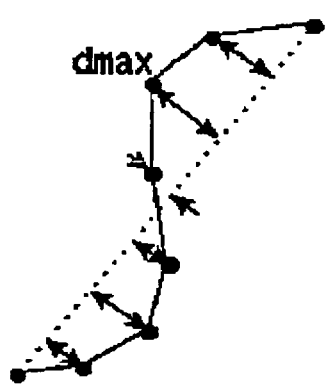
Figure 6C:
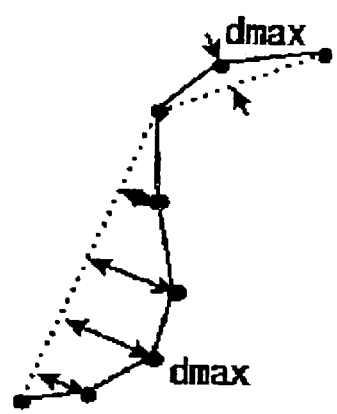
Figure 6D:
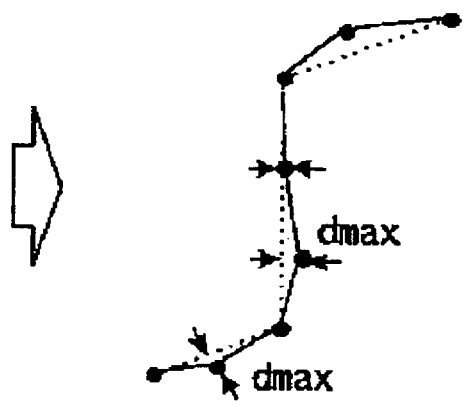

Lets us now assume that the shape of the actual road is as indicated in FIG. 6A. The lengths of the perpendiculars connecting the individual points with the line (the dotted line) that connects the two end points (referred to as the first end point and the second end point) are measured and the largest perpendicular length dmax among them is determined. Then, if dmax thus ascertained is determined to be equal to or greater than a predetermined value setting ϵ (namely, if dmax≧ϵ), the corresponding make-up point is retained. Namely, as shown in FIG. 6C, a point corresponding to dmax is added as a new end point (to be referred to as a third end point) and lines connecting the first end point with the third end point and the third end point with the second end point are drawn as indicated with the dotted lines. It is to be noted that the "points" or "make-up points" as referred to in this context determine the shape of a given road, i.e., a given link string, and are equivalent to nodes or shape interpolation points (points set between nodes to determine the link shape) in the road data explained earlier.

Figure 6E:
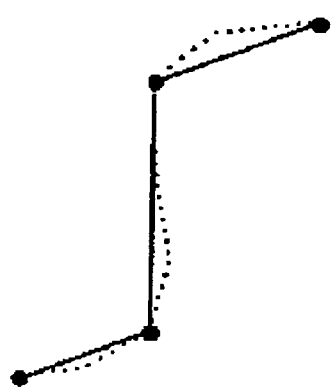

Processing similar to that described above is repeatedly executed until the largest perpendicular length dmax becomes smaller than ϵ. In the state shown in FIG. 6D, dmax is smaller than ϵ. At this time, the shape of the road is indicated with straight lines connecting end points closest to each other. As a result, the road shape shown in FIG. 6E is achieved. Through this processing, the shape of the road is linearized.

Figure 7A:
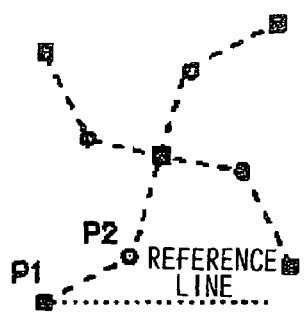
FIGS. 7A to 7H illustrate the streamline processing (2) also executed to generate an abridged map.
Figure 7B:
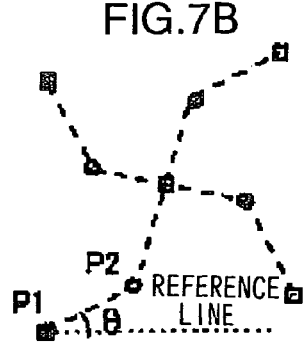

FIGS. 7A to 7H shows streamline processing (2) through which the shapes of roads are orthogonalized. Assuming that the shapes of the actual roads are as shown in FIG. 7A, a straight line extending parallel to the x-axis (the horizontal direction in the map), which passes through a first point (P1) in the first polygonal line, is determined. This straight line indicated with the dotted line in the figure is used as a reference line. Next, as shown in FIG. 7B, the angle θ formed by the vector (link) P1P2 connecting the point P1 and the next point P2 relative to the reference line is determined.

Figure 7C:
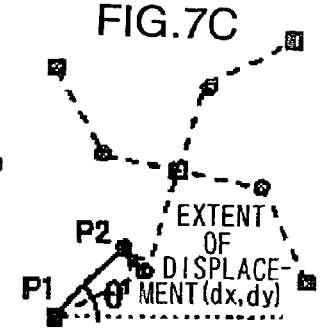

Next, as shown in FIG. 7C, the vector P1P2 is rotated around the start point P1 so that θ'=n·Δθ (n is an integer) when the vector length is fixed. As a result, the end point P2 becomes displaced. It is to be noted that the angle Δθ is the unit angle representing the increments with which the vector P1P2 is rotated and may be, for instance, 45°. Through this processing, the angle formed by the vector P1P2 and the reference line is corrected in the increments of the unit angle Δθ.

Figure 7D:
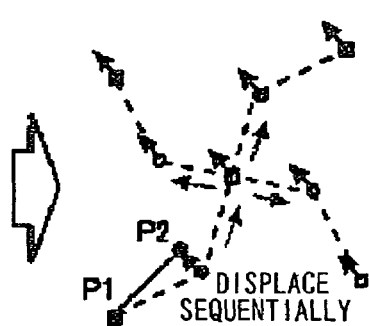

Then, as illustrated in FIG. 7D, beyond the point P2, the displacement of points is propagated by an extent matching the displacement (dx, dy) of the point P2. During this process, an intersection is displaced to branch points. Thus, the positions of the other points are displaced through propagation of the displacement.

Figure 7E:
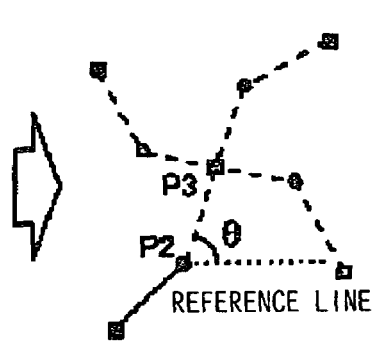
Figure 7F:
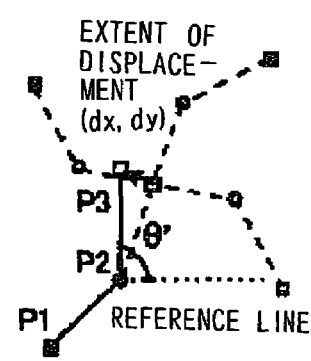
Figure 7G:
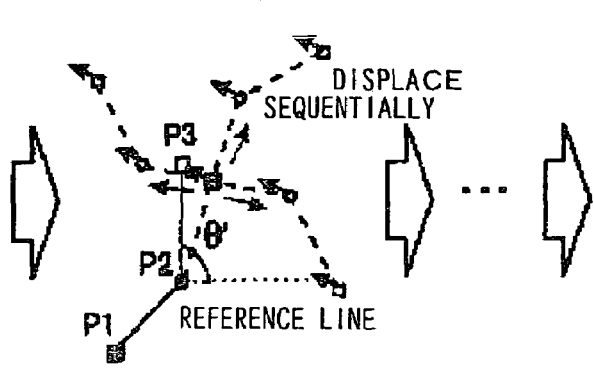

Subsequently, processing similar to that described above is repeatedly executed. Namely, as shown in FIG. 7E, a straight line passing through the point P2 and running parallel to the x-axis is designated as a reference line and the angle θ formed by the next vector P2P3 and the reference line is determined. Then, as shown in FIG. 7F, the vector P2P3 is rotated around the start point P2 so that θ' becomes equal to n·Δθ, and thus, the end point P3 is displaced. Subsequently, as illustrated in FIG. 7G, the displacement of points is propagated beyond the point P3 by an extent matching the displacement (dx, dy) of the point P3. During this process, an intersection is displaced to branch points.

Figure 7H:
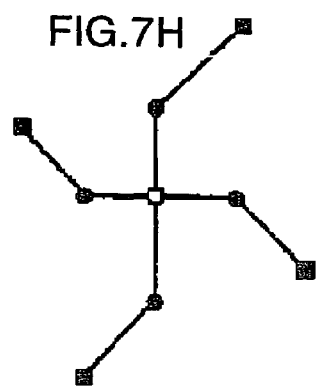

As the processing described above is executed for all the points in sequence by repeating similar operations, the road shapes shown in FIG. 7H are ultimately achieved. Through the processing, the road shapes are orthogonalized. Once the road shapes are linearized and orthogonalized as described above, the streamline processing ends. The abridged map is created by executing the streamline processing over the map range having been set.

On the abridged map generated as described above, landmarks indicating the positions of various types of facilities are displayed as in the original, pre-streamline map. However, as the road shapes are simplified through the streamline processing, the positions of the roads in the abridged map become different from their positions in the original map. For this reason, the landmarks displayed at the original positions on the abridged map would not indicate the correct positional relationships between the roads and the landmarks. Accordingly, it is necessary to correct the landmark positions after the streamline processing. The following is an explanation of the method adopted to execute the landmark position correction.

Figure 8A:
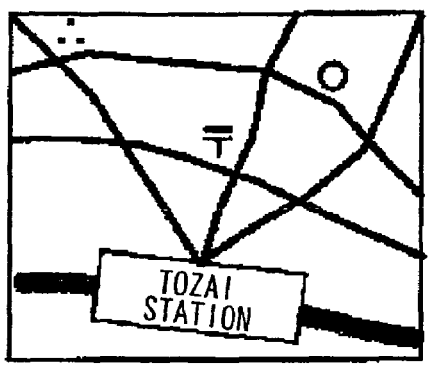
FIGS. 8A to 8C outline the landmark position correction.
Figure 8B:
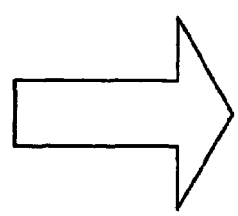
Figure 8B:
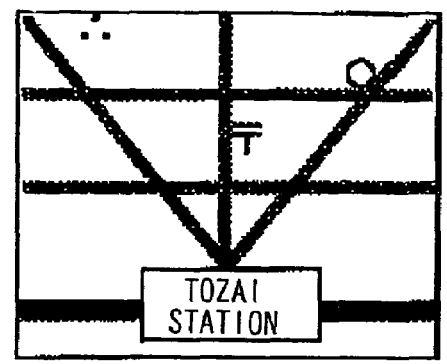
Figure 8C:
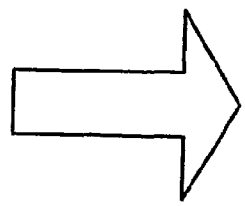
Figure 8C:
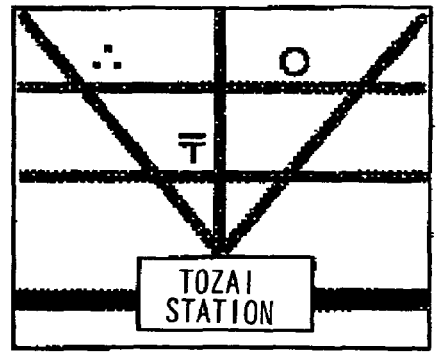

FIGS. 8A to 8C outline the landmark position correction executed in step S9. As shown in FIG. 8A, subtle positional relationships between the landmark positions and the roads are reflected in the map prior to the streamline processing. Namely, the landmark positions that may assume any angles in the detailed map indicate subtle positional relationships of the landmark positions to the roads. When the streamline processing (shape data streamlining) explained earlier is executed on this original map and the original positions of the landmarks are displayed on the streamlined map without any correction, the resulting abridged map may be as shown in FIG. 8B.

In the abridged map shown in FIG. 8B, only the road positions are altered from their positions in the original map in FIG. 8A and the actual positional relationships between the landmarks and the roads are not correctly reflected. Namely, since the landmark positions still do not reflect the positions indicated in the stream lined shape data, the position of a landmark is shown on the side of the road opposite from the side where it is situated on the original map for instance. More specifically, the position of the post office located around the center of the map is indicated in the abridged map in FIG. 8B on the side of the road opposite from the side on which it is indicated in the original map in FIG. 8A. As the means for addressing this problem, the landmark position correction is executed to approximate the positional relationships between the roads and the landmarks in the abridged map to the positional relationships in the original map, as shown in FIG. 8C.

Figure 9A:
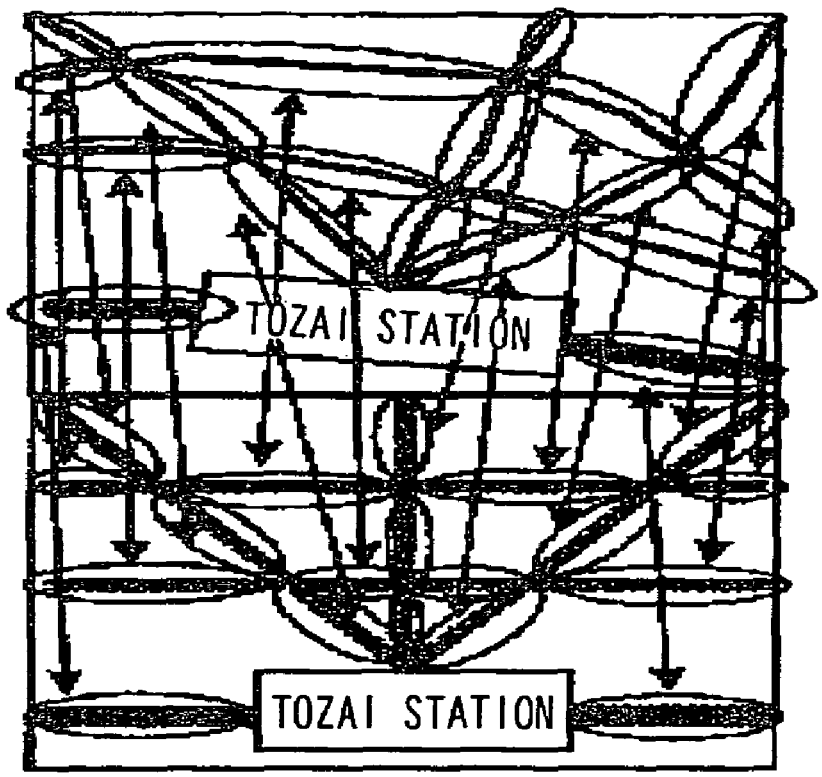
FIGS. 9A and 9B illustrate the detail algorithm used in the landmark position correction.
Figure 9B:
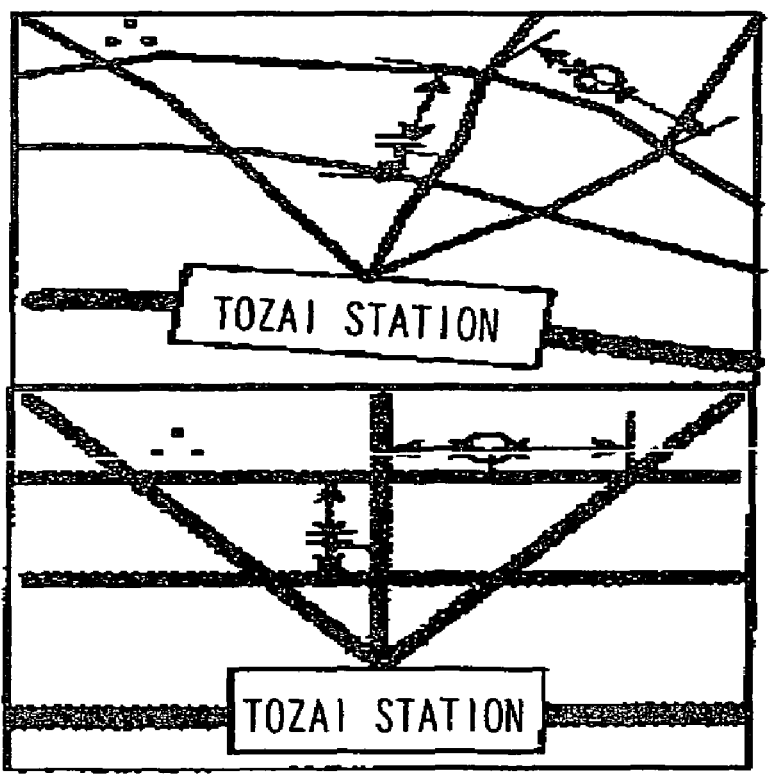

Next, in reference to FIGS. 9A and 9B, the detail algorithm used in the land mark position correction is explained. In the landmark position correction, a pair list of pairs of shape vectors, each pair made up of a pre-abridge shape vector and a corresponding post-abridge shape vector, is created as shown in FIG. 9A. When the streamline processing explained earlier is executed to abridge the original map, the number of make-up points constituting each shape vector indicating a road shape changes from the initial number. Accordingly, when compiling the pair list, it is necessary to ensure that the directionalities of the branching point in the shape vectors corresponding to each other and constituting a pair in the pair list match. In other words, it is necessary to ensure that a one-on-one correlation is achieved with regard to the positions of the corresponding branching points in the pre-streamline vector and the post-streamline vector.

Once the pair list is compiled as described above, correction processing is executed to equalize the ratios of the norms of the individual shape vectors in the pair to the corresponding distances to the branching points, as shown in FIG. 9B. Namely, the ratios of the norm value of the shape vector closest to each landmark and the distances between the landmark and the corresponding branching points along the route containing the shape vector in the pre-abridge original map are measured. Based upon these measured values, the position of the landmark on the abridged map having undergone the streamline processing is calculated so as to equalize the ratios of the norm value of the corresponding shape vector in the pair list and the distances from the landmark to the individual branching points to the ratios in the original map. Finally, the landmark is displayed at the position thus calculated.

Since the shapes of the roads and the distances indicated in the abridged map obtained by executing the streamline processing on the regular map become different, it is necessary to convert the coordinates of the relevant landmarks (stores located along the roads, etc.) in conformance to the changes in the road shapes and the distances, as part of the landmark position correction. Accordingly, positional parameters with regard to the position of each landmark prior to the conversion, e.g., the position of the landmark prior to the conversion expressed as a percentage from one end of the road (link), the side of the road on which the landmark is located and the distance indicating how far off the road the landmark is located, are determined. Then, the post-conversion landmark position in the corresponding road data having undergone the conversion is determined by using these three parameters. This process is now explained in reference to the specific example presented in FIGS. 10A and 10B.

Figure 10A:
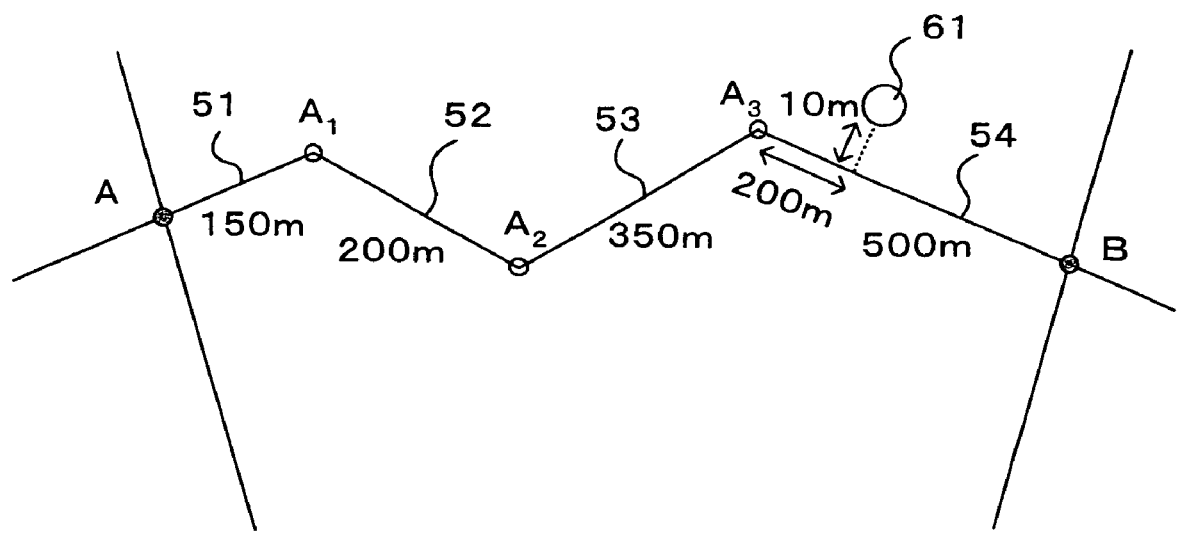
FIGS. 10A and 10B present a specific example of the landmark position correction.

FIG. 10A presents an example of a landmark position in a regular map that has not undergone the streamline processing. The road connecting a point A and a point B is constituted with a link 51 extending between the point A and a point A1, a link 52 extending between the point A1 and a point A2, a link 53 extending between the point A2 and a point A3 and a link 54 extending between the point A3 and the point B, and a landmark 61 is present along the road. The lengths of the links 51 to 54 are respectively 150 m, 200 m, 350 m and 500 m, and the road connecting the points A and B thus has a length which is the sum, i.e., 1200 m, of the lengths of the individual links constituting the road. The landmark 61 is located at a point 200 m measured from the point A3 toward the point B, i.e., at a point 900 m measured from the point A, on the left side of the road. In addition, the landmark 61 is located at a position distanced from the road by 10 m.

The three parameters explained earlier are determined with regard to the pre-streamline landmark position. The first parameter, i.e., the ratio of the distance to the landmark from one end of the road (from the point A) to the entire distance is 900/1200=0.75 (75%). The second parameter, i.e., the side of the road on which the landmark is located, is determined to be the left side of the road heading toward the point B from the point A. The third parameter, i.e., the distance indicating how far the landmark is off the road, is determined to be 10 m.

Figure 10B:
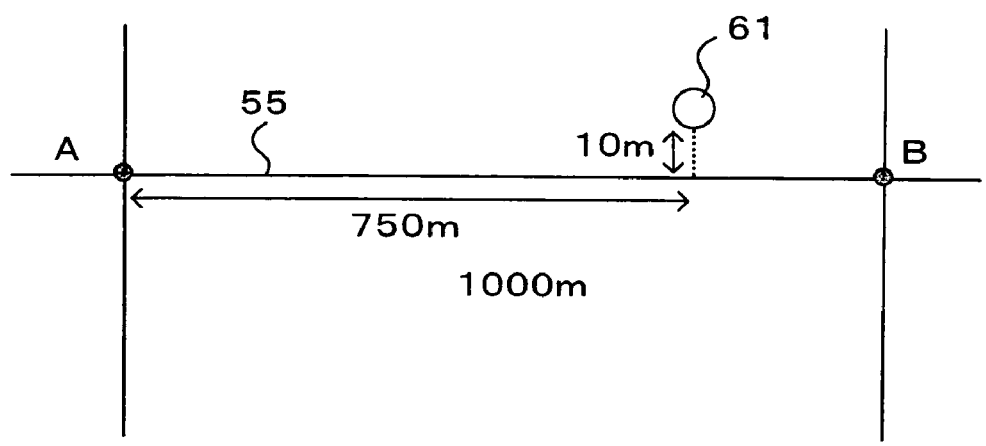

FIG. 10B presents an example of the landmark position in the abridged map obtained by executing the streamline processing. In this abridged map, the road connecting the point A and the point B is indicated with a single link 55 the length of which is 1000 m. When displaying the landmark 61 on this abridged map, the converted position of the landmark is determined based upon the three parameters having been obtained as described above. Namely, the distance from the point A is calculated to be 1000×0.75=750 m based upon the first parameter. In addition, based upon the second parameter and the third parameter, the position of the landmark is determined to be at the point located on the left side of the road (the link 55) viewed from the point A and distanced from the road by 10 m. The position of the landmark 61 is corrected as the landmark 61 is displayed at the position satisfying these requirements.

Through the processing explained above, the individual landmarks are indicated at corrected positions in the abridged map and the positional relationships between the roads and the landmarks are approximated to those in the unabridged original map. Thus, the landmark positions in the original map shown in FIG. 8A are displayed at the positions shown in FIG. 8C in the abridged map. With the corrected landmark positions indicated on the map obtained through the streamline processing as described above, the abridged map is created.

The following advantages are achieved in the embodiment described above.

(1) A decision is made (step S3) based upon the map data as to whether or not each road is a special shape road, and if it is determined to be a special shape road, it is replaced with a specific road shape pattern stored in memory in advance (step S4). Then, such road shape patterns are connected with abridged roads obtained by abridging the original road map and the resulting map is displayed as the abridged map (step S9). As a result, an abridged map indicating special shape roads, which would be rendered more complicated than the actual road shapes through streamline processing (linearization processing, orthogonalization processing), with simplified, easy-to-read patterns, can be displayed.

(2) In addition, the shapes of roads other than special shape roads are simplified through the streamline processing (step S5) and, as a result, and abridged map in which the road shapes of all the roads are simplified for easy reading is created and displayed.

(3) The decision with regard to whether or not each road is a special shape road can be made with ease based upon the link types set for the individual links.

(4) If a given road is determined to be a circular intersection the data of the road are replaced with a circular road shape pattern, if a road is determined to be a side road, the data of the road are replaced with a trapezoidal road shape pattern, and if a road is determined to be a bidirectional lane, the data of the road is replaced with a single-line linear road shape pattern representing both the upward traffic and the downward traffic. Thus, these special shape roads are rendered in the matching simplified road shapes.

It is to be noted that the links are selected in sequence and if a particular link is determined to be assigned with a specific link type, the link is replaced with the corresponding road shape pattern when creating the abridged map in the embodiment. Instead, all the links may be streamlined first, and then streamlined links (abridged roads) assigned with the specific link types may be replaced with the corresponding road shape patterns. In such a case, it is desirable to adjust the sizes of the road shape patterns in correspondence to the areas over which the links are to be replaced with the patterns.

In addition, links assigned with the specific link types are judged to be special shape roads not suited for the streamline processing and are replaced with the road shape patterns in the embodiment described above. A method other than that explained in reference to the embodiment may be adopted to make a decision as to whether or not roads are special shape roads. For instance, an area containing a great number of steep mountain roads and the like may be specified in advance, and when creating the abridged map, the links contained in the area may be regarded to be special shape roads to be replaced with a road shape pattern corresponding to the specified area. Alternatively, the decision as to whether or not a given road is a special road can be made based upon the positional relationship among nodes and shape interpolation points as well.

While an explanation is given above in reference to the embodiment on an example in which the abridged map is created in a navigation system by reading out the map data from a storage medium such as a DVD-ROM, the present invention is not limited to this example. For instance, the present invention may be adopted in a communication navigation system that downloads the map data from an information distribution center through wireless communication via a portable telephone or the like. In such an application, the abridged map may be generated as described above at the information distribution center, and signals indicating the results of the abridged map generation processing may be output from the information distribution center to be delivered to the navigation system. Namely, the information distribution center should be constituted with a device that generates the abridged map and a device that outputs the signals constituting the abridged map to an external recipient.

Figure 11:
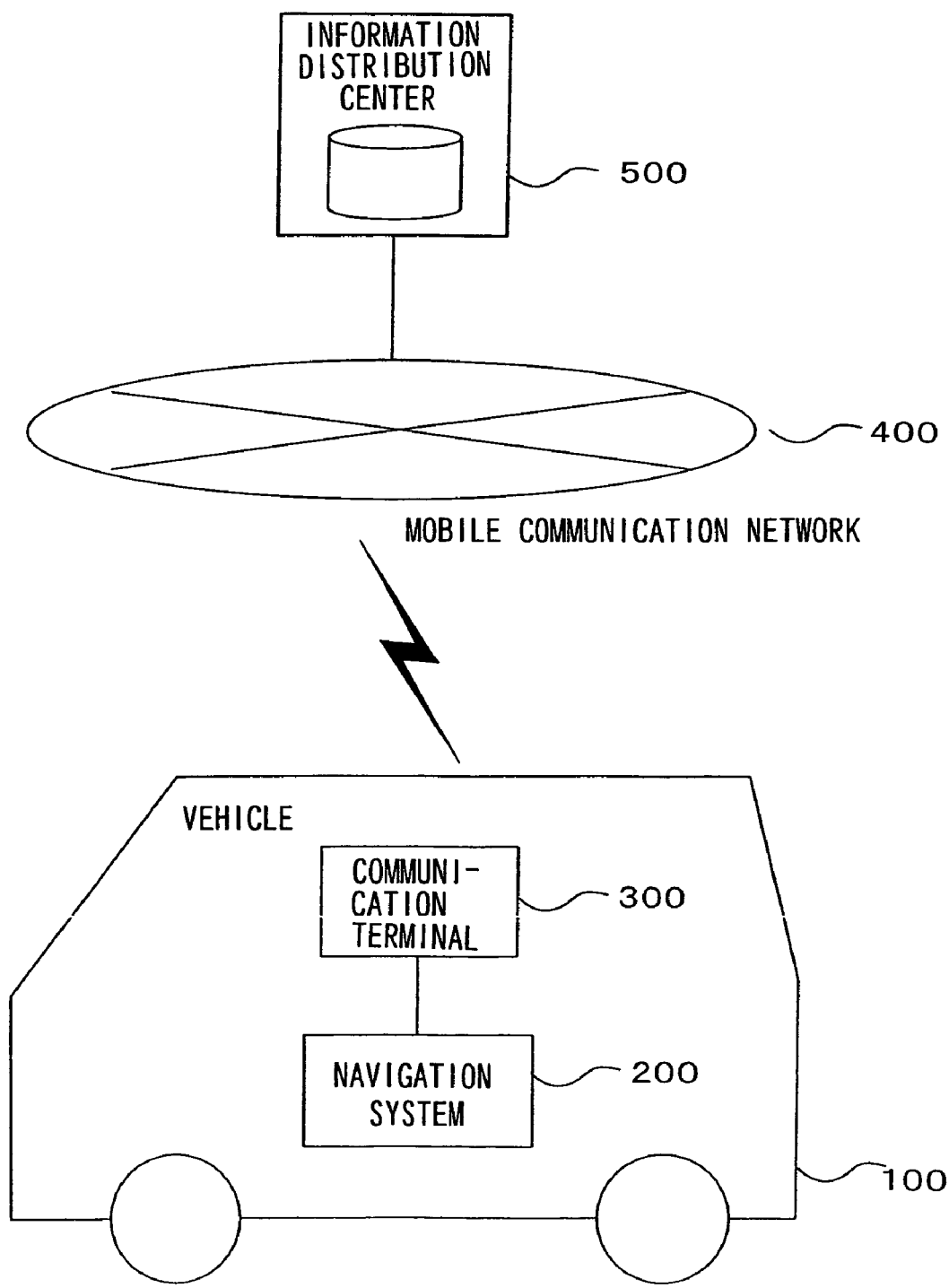
FIG. 11 shows how the present invention may be adopted in conjunction with a communication navigation system.

FIG. 11 shows the configuration of such an application. A navigation system 200 installed in a vehicle 100 is connected with a communication terminal 300. The communication terminal 300 may be, for instance, a portable telephone. The communication terminal 300 is wirelessly connected with a mobile communication network 400. An information distribution center 500 is connected with the mobile communication network 400. Namely, the navigation system 200 is connected to the information distribution center 500 via the communication terminal 300 and the mobile communication network 400. As the navigation system 200 becomes connected with the information distribution center 500, the navigation system 200 transmits a map data distribution request to the information distribution center 500. In response to the distribution request, the information distribution center 500 executes the processing explained in detail earlier and distributes the resulting map data to the navigation system 200. The navigation system 200 receives the map data transmitted from the information distribution center 500 via the mobile communication network 400 and the communication terminal 300. The present invention may be adopted effectively in such a communication navigation system as well.

Figure 12:
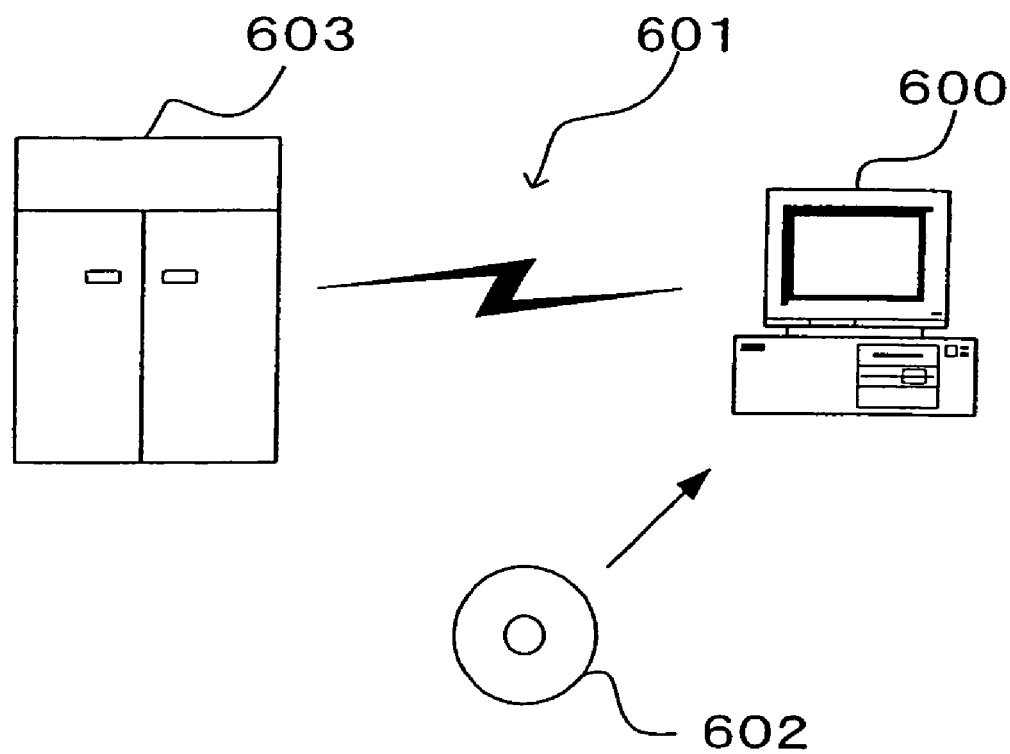
FIG. 12 shows how the present invention may be adopted in conjunction with a personal computer.

It is to be noted that when the present invention is adopted in conjunction with a personal computer or the like, the program used to implement the control described above may be provided in a recording medium such as a CD-ROM or via an electric communication network such as the Internet. FIG. 12 shows the configuration that may be adopted in such an application. A personal computer 600 obtains the program via a CD-ROM 602. In addition, the personal computer 600, which can be connected with a communication line 601, may obtain the program from a server 603. The communication line 601 may be a communication line for Internet communication, personal computer communication or the like, or it may be a dedicated communication line. The server 603 transmits the program to the personal computer 600 via the communication line 601. In other words, the program is converted to data signals transmitted on a carrier wave and the data signals resulting from the conversion are transmitted via the communication line 601. As described above, the program may be distributed as a computer-readable computer program product adopting any of various modes including a recording medium and a carrier wave.

The present invention is not limited to the embodiment described above and other modes that are conceivable within the technical field of the present invention are included within the scope of the present invention.

What is claimed is:

1. An on-vehicle information terminal comprising:
    an abridged road generating device configured to generate an abridged road by abridging a road map based upon a map data;
    a road decision-making device configured to make a decision as to whether or not a road is a special shape road having a predetermined special shape based upon the map data;

a substituting device configured to substitute a specific road shape pattern stored in memory in advance for the road judged to be the special shape road by the road decision-making device; and a display control device configured to display at a display device an abridged map containing the specific road shape pattern substituted for the special shape road by the substituting device and the abridged road generated by the abridged road generating device.

2. An on-vehicle information terminal according to claim 1, wherein:
the abridged road generating device generates the abridged roads through streamline processing for simplifying road shapes by linearizing and orthogonalizing the road shapes based upon the map data.

3. An on-vehicle information terminal according to claim 1, wherein:
a road in the map data is constituted with a plurality of links for each of which a link type indicating a road type is set; and
the road decision-making device makes a decision as to whether or not a road is the special shape road based upon the link type.

4. An on-vehicle information terminal according to claim 3, wherein:
the special shape road includes a circular intersection;
the road decision-making device makes a decision as to whether or not a road is the circular intersection based upon the link type; and
the substituting device substitutes a circular or elliptical road shape pattern stored in memory in advance for the road judged to be the circular intersection by the road decision-making device.

5. An on-vehicle information terminal according to claim 3, wherein:
the special shape road includes a side road;
the road decision-making device makes a decision as to whether or not a road is the side road based upon the link type; and
the substituting device substitutes a trapezoidal road shape pattern, a triangular road shape pattern or a circular arc road shape pattern stored in memory in advance for the road judged to be the side road by the road decision-making device.

6. An on-vehicle information terminal according to claim 3, wherein:
the special shape road includes a bidirectional lane;
the road decision-making device makes a decision as to whether or not a road is the bidirectional lane based upon the link type; and
the substituting device substitutes a single-line linear road shape pattern stored in memory in advance for the road judged to be the bidirectional lane by the road decision-making device to represent a traffic moving in both directions together.

7. An on-vehicle information terminal according to claim 2, wherein:
a road in the map data is constituted with a plurality of links for each of which a link type indicating a road type is set; and
the road decision-making device makes a decision as to whether or not a road is the special shape road based upon the link type.

8. An on-vehicle information terminal according to claim 7, wherein:
the special shape road includes a circular intersection;
the road decision-making device makes a decision as to whether or not a road is the circular intersection based upon the link type; and
the substituting device substitutes a circular or elliptical road shape pattern stored in memory in advance for the road judged to be the circular intersection by the road decision-making device.

9. An on-vehicle information terminal according to claim 4, wherein:
the special shape road includes a side road;
the road decision-making device makes a decision as to whether or not a road is the side road based upon the link type; and
the substituting device substitutes a trapezoidal road shape pattern, a triangular road shape pattern or a circular arc road shape pattern stored in memory in advance for the road judged to be the side road by the road decision-making device.

10. An on-vehicle information terminal according to claim 7, wherein:
the special shape road includes a side road;
the road decision-making device makes a decision as to whether or not a road is the side road based upon the link type; and
the substituting device substitutes a trapezoidal road shape pattern, a triangular road shape pattern or a circular arc road shape pattern stored in memory in advance for the road judged to be the side road by the road decision-making device.

11. An on-vehicle information terminal according to claim 8, wherein:
the special shape road includes a side road;
the road decision-making device makes a decision as to whether or not a road is the side road based upon the link type; and
the substituting device substitutes a trapezoidal road shape pattern, a triangular road shape pattern or a circular arc road shape pattern stored in memory in advance for the road judged to be the side road by the road decision-making device.

12. An on-vehicle information terminal according to claim 4, wherein:
the special shape road includes a bidirectional lane;
the road decision-making device makes a decision as to whether or not a road is the bidirectional lane based upon the link type; and
the substituting device substitutes a single-line linear road shape pattern stored in memory in advance for the road judged to be the bidirectional lane by the road decision-making device to represent a traffic moving in both directions together.

13. An on-vehicle information terminal according to claim 5, wherein:
the special shape road includes a bidirectional lane;
the road decision-making device makes a decision as to whether or not a road is the bidirectional lane based upon the link type; and
the substituting device substitutes a single-line linear road shape pattern stored in memory in advance for the road judged to be the bidirectional lane by the road decision-making device to represent a traffic moving in both directions together.

14. An on-vehicle information terminal according to claim 7, wherein:
the special shape road includes a bidirectional lane;
the road decision-making device makes a decision as to whether or not a road is the bidirectional lane based upon the link type; and
the substituting device substitutes a single-line linear road shape pattern stored in memory in advance for the road judged to be the bidirectional lane by the road decision-making device to represent a traffic moving in both directions together.

15. An on-vehicle information terminal according to claim 8, wherein:
the special shape road includes a bidirectional lane; the road decision-making device makes a decision as to whether or not a road is the bidirectional lane based upon the link type; and
the substituting device substitutes a single-line linear road shape pattern stored in memory in advance for the road judged to be the bidirectional lane by the road decision-making device to represent a traffic moving in both directions together.

16. An on-vehicle information terminal according to claim 9, wherein:
the special shape road includes a bidirectional lane;
the road decision-making device makes a decision as to whether or not a road is the bidirectional lane based upon the link type; and
the substituting device substitutes a single-line linear road shape pattern stored in memory in advance for the road judged to be the bidirectional lane by the road decision-making device to represent a traffic moving in both directions together.

17. An on-vehicle information terminal according to claim 10, wherein:
the special shape road includes a bidirectional lane;
the road decision-making device makes a decision as to whether or not a road is the bidirectional lane based upon the link type; and
the substituting device substitutes a single-line linear road shape pattern stored in memory in advance for the road judged to be the bidirectional lane by the road decision-making device to represent a traffic moving in both directions together.

18. An on-vehicle information terminal according to claim 11, wherein:
the special shape road includes a bidirectional lane;
the road decision-making device makes a decision as to whether or not a road is the bidirectional lane based upon the link type; and
the substituting device substitutes a single-line linear road shape pattern stored in memory in advance for the road judged to be the bidirectional lane by the road decision-making device to represent a traffic moving in both directions together.

19. An abridged map generating apparatus, comprising:
an abridged road generating device configured to generate an abridged road by abridging a road map based upon a map data;
a road decision-making device configured to make a decision as to whether or not a road is a special shape road having a predetermined special shape based upon the map data;
a substituting device configured to substitute a specific road shape pattern stored in memory in advance for the road judged to be the special shape road by the road decision-making device; and
an abridged map output device configured to output to an external recipient a signal constituting an abridged map containing the specific road shape pattern substituted for the special shape road by the substituting device and the abridged road generated by the abridged road generating device.

20. An abridged map display method, comprising:
generating, by an abridged road generating device, an abridged road by abridging a road map based upon a map data;
making a decision, by a road decision making device, as to whether or not a road is a special shape road having a predetermined special shape based upon the map data;
substituting, by a substituting device, a specific road shape pattern stored in memory in advance for the road judged to be the special shape road; and
displaying, by a display control device, an abridged map containing the specific road shape pattern substituted for the special shape road and the abridged road.

21. An abridged map display method, comprising:
generating, by an abridged road generating device, an abridged road by abridging a road map based upon a map data;
making a decision, by a road decision making device, as to whether or not a road is a special shape road having a predetermined special shape based upon the map data;
substituting, by a substituting device, a specific road shape pattern stored in memory in advance for the road judged to be the special shape road; and
outputting, by an abridged map output device, to an external recipient a signal constituting an abridged map containing the specific road shape patterns substituted for the special shaped by the substituting device and the abridged road generated by the abridged road generating device.

* * * * *

UNITED STATES PATENT AND TRADEMARK OFFICE
CERTIFICATE OF CORRECTION

PATENT NO. : 7,668,650 B2  Page 1 of 1
APPLICATION NO. : 11/087970
DATED : February 23, 2010
INVENTOR(S) : Sumizawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 461 days.

Signed and Sealed this

Twenty-eighth Day of December, 2010

David J. Kappos
*Director of the United States Patent and Trademark Office*